(12) United States Patent
Tao et al.

(10) Patent No.: US 10,970,313 B2
(45) Date of Patent: Apr. 6, 2021

(54) CLUSTERING DEVICE, CLUSTERING METHOD, AND COMPUTER PROGRAM PRODUCT

(71) Applicant: KABUSHIKI KAISHA TOSHIBA, Tokyo (JP)

(72) Inventors: Yaling Tao, Kanagawa (JP); Kentaro Takagi, Kanagawa (JP); Kouta Nakata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 221 days.

(21) Appl. No.: 16/296,458

(22) Filed: Mar. 8, 2019

(65) Prior Publication Data
US 2019/0347277 A1    Nov. 14, 2019

(30) Foreign Application Priority Data

May 9, 2018  (JP) .............................. JP2018-090495

(51) Int. Cl.
*G06F 16/28*       (2019.01)
*G06F 16/25*       (2019.01)
(Continued)

(52) U.S. Cl.
CPC .......... *G06F 16/285* (2019.01); *G06F 16/258* (2019.01); *G06N 3/04* (2013.01); *G06N 3/08* (2013.01)

(58) Field of Classification Search
CPC .......... G06F 16/285; G06N 3/04; G06N 3/08
See application file for complete search history.

(56) References Cited

U.S. PATENT DOCUMENTS 9,336,302 B1 * 5/2016 Swamy ................. G06F 16/355
2016/0019587 A1 * 1/2016 Hueter ................... G06N 20/00
                                                             705/14.53
(Continued)

FOREIGN PATENT DOCUMENTS

JP          2019-46236 A        3/2019

OTHER PUBLICATIONS

Miyato, T., et al., "Distributional Smoothing with Virtual Adversarial Training", ICLR 2016, arXiv:1507.00677, pp. 1-12 (Jun. 11, 2016).
(Continued)

*Primary Examiner* — Bruce M Moser
*Assistant Examiner* — Chongsuh Park
(74) *Attorney, Agent, or Firm* — Finnegan, Henderson, Farabow, Garrett & Dunner L.L.P.

(57) ABSTRACT

According to one embodiment, a communication device includes one or more processors. The processors decide on a first-type parameter representing a conversion operation for converting input data into first-type conversion data. The processors calculate first-type predicted distributions based on second-type parameters, each representing one of the plurality of clusters. The processors update the first-type parameter and the second-type parameters so as to achieve optimization of first-type differences representing differences between the first-type predicted distributions and a target distribution, and second-type differences representing differences between the first-type predicted distributions and second-type predicted distributions that indicate probability at which second-type converted data. The second-type converted data is obtained by converting data, which is formed by augmentation of the input data, using the first-type parameter belongs to the clusters. The processors classify the input data into the plurality of clusters based on the
(Continued)

first-type predicted distributions calculated using the updated second-type parameters.

12 Claims, 6 Drawing Sheets

(51) Int. Cl.
*G06N 3/04* (2006.01)
*G06N 3/08* (2006.01)

(56) References Cited

U.S. PATENT DOCUMENTS

2018/0060469 A1* 3/2018 Morgan ................. G06F 30/20
2019/0073587 A1 3/2019 Takagi et al.

OTHER PUBLICATIONS

Xie, J., et al., "Unsupervised Deep Embedding for Clustering Anaysis", arX.1511.06335v2, 10 pages (May 24, 2016).

* cited by examiner

FIG.4

|  | K-means | DEC | RDEC $\gamma=2$ s=2 | RDEC $\gamma=5$ s=2 | RDEC $\gamma=5$ s=4 |
|---|---|---|---|---|---|
| MNIST | 53.36 (0.12) | 93.29 (3.83) | 98.21 (0.05) | 98.43 (0.03) | 98.32 (0.05) |
| MNIST_Imb_0 | 50.46 (0.06) | 88.58 (3.84) | 93.29 (3.85) | 97.03 (1.26) | 97.82 (0.54) |
| Reuters | 53.36 (0.20) | 73.83 (3.56) | 74.92 (3.10) | 75.27 (3.70) | 77.51 (4.09) |
| Reuters_Imb | 55.68 (0.15) | 71.95 (3.20) | 72.86 (3.30) | 73.54 (3.56) | 76.52 (3.30) |
| STL_VGG | 70.10 (0.19) | 84.83 (6.67) | 88.87 (4.70) | 89.44 (4.69) | 82.03 (5.67) |
| STL_VGG_Imb | 73.97 (3.77) | 87.12 (5.18) | 88.43 (0.43) | 88.69 (0.53) | 88.55 (0.10) |

CLUSTERING DEVICE, CLUSTERING METHOD, AND COMPUTER PROGRAM PRODUCT

CROSS-REFERENCE TO RELATED APPLICATIONS

This application is based upon and claims the benefit of priority from Japanese Patent Application No. 2018-090495, filed on May 9, 2018; the entire contents of which are incorporated herein by reference.

FIELD

Embodiments described herein relate generally to a clustering device, a clustering method, and a computer program product.

BACKGROUND

Clustering is a technology for classifying the data points included in a dataset into a plurality of classes. As an example of clustering, a technology called deep embedded clustering (DEC) that makes use of deep neural networks has been proposed.

However, in the conventional technology such as the DEC technique, it is difficult to accurately classify the classes having only a small number of samples, and sometimes there is deterioration in the classification performance with respect to imbalanced datasets.

BRIEF DESCRIPTION OF THE DRAWINGS

FIG. 4 is a diagram illustrating the accuracy of clustering achieved in the conventional methods and according to the embodiment;

DETAILED DESCRIPTION

Figure 1:
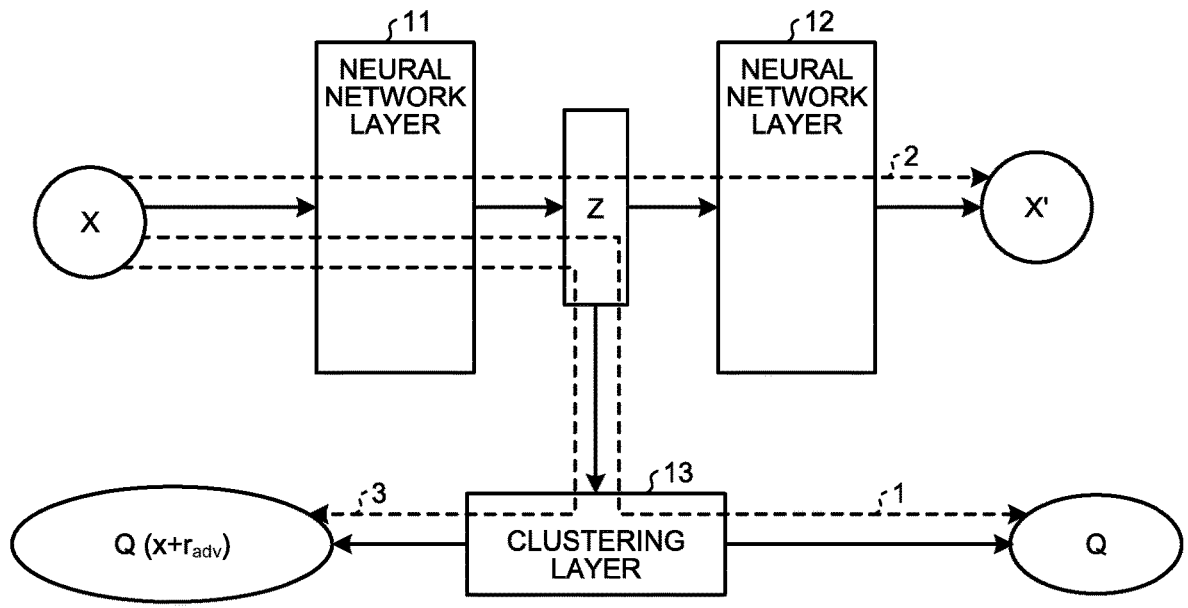
FIG. 1 is a diagram illustrating an exemplary network model according to an embodiment.

According to one embodiment, a communication device includes one or more processors. The processors decide on a first-type parameter representing a conversion operation for converting input data into first-type conversion data. The processors calculate first-type predicted distributions based on second-type parameters. The first-type predicted distributions represent the plurality of clusters. The processors update the first-type parameter and the second-type parameters so as to achieve optimization of first-type differences representing differences between the first-type predicted distributions and a target distribution, and second-type differences representing differences between the first-type predicted distributions and second-type predicted distributions that indicate probability at which second-type converted data. The second-type converted data is obtained by converting data, which is formed by augmentation of the input data, using the first-type parameter belongs to the clusters. The processors classify the input data into the plurality of clusters based on the first-type predicted distributions calculated using the updated second-type parameters A preferred embodiment of a clustering device according to the invention is described below in detail with reference to the accompanying drawings.

Firstly, the explanation is given about the overview and the points at issue in the DEC technique. For example, the DEC technique has the following features.

- The premise is that the initial values of predicted distributions are assumed to be accurately predicted to a certain extent.
- In a cluster, data close to the centroid gathers at the centroid.
- The data near the boundary moves closer to the centroid of clusters having a small number of samples of data.

According to the features described above, in the DEC technique, if the positioning of the centroids is poor, there is deterioration in the performance. Such a situation occurs particularly when the processing target happens to be an imbalanced dataset. An imbalanced data is, for example, a dataset in which the number of data points belonging to each class is unequal. An imbalanced dataset arises in the following situations, for example.

- A dataset is used in medical diagnosis and contains data of rare diseases.
- A dataset is used in product inspection and contains data of defective products that get rarely manufactured.

Meanwhile, a dataset also contains, for example, data recorded during the process of product inspection.

In that regard, in the clustering device according to the embodiment, the data augmentation technology and the DEC technique are combined so that the clustering accuracy can be enhanced also with respect to imbalanced datasets. Examples of the data augmentation technology include the virtual adversarial training (VAT) technique. In the VAT technique, the target data for clustering is subjected to small changes (perturbation) so as to achieve data augmentation, and that is followed by the learning of the deep neural network. The learning is performed in such a way that the data obtained by adding perturbation to the target data for processing has the same distribution in the latent space. In the VAT technique, perturbation is added in the direction in which the amount of change in the predicted distributions is greater than the other directions (for example, the direction in which the amount of change is the highest).

Meanwhile, the data augmentation can be achieved by implementing some other method other than the VAT technique. For example, it is possible to implement a method in which a fixed perturbation is added to the input data or a method in which a conversion operation such as rotation is performed with respect to the input data.

The VAT technique can be interpreted as a learning method for regularizing a neural network. In the VAT technique, for example, learning is performed in such a way that all data surrounding particular data is included in the same distribution. Moreover, in the VAT technique, learning is performed in such a way that a plurality of similar data points are pushed closer together in the latent space.

In the embodiment, as a result of combining the VAT technique with the DEC technique, while grouping the distribution of mutually similar data (i.e., implementation of the VAT technique), data condensation is performed while pushing away the centroids of the respective clusters (i.e., implementation of the DEC technique). In the following explanation, the method according to the embodiment is sometimes called regularized deep embedded clustering (RDEC).

In the embodiment, the target data for processing (the input data) can be of any type. Examples of the type of input data include image data, text data, and sensor data. Moreover, for example, the data format is in the vector form. However, any other data format can also be used.

Given below is the explanation of the terms used in the embodiment.

In the embodiment, a dataset X represents a plurality of data points to be processed. The dataset X includes n number of data points (sample data) (where n is an integer equal to or greater than two). Each of the n number of data points is assumed to be d-dimensional data (where d is an integer equal to or greater than two). Moreover, $x_i \in R^d$ represents the data point that is included in the dataset X and that is identified by an index i (where $0 \leq i \leq n-1$ holds true). When there is no need to distinguish among the data points, the index i is omitted and the data is simply referred to as data x.

Furthermore, K represents the number of clusters to be classified. The clusters are identified by an index j (where $0 \leq j \leq K-1$ holds true). Each cluster is expressed using a centroid $u_j$. The centroid represents an example of the cluster parameter (a second-type parameter). In clustering, each data point x is classified in K number of clusters in such a way that all samples (data) belonging to the same cluster remain mutually similar and that the samples (data) belonging to different clusters remain mutually dissimilar.

In the embodiment (in the RDEC technique), in an identical manner to the DEC technique, direct clustering is not performed in the space including the dataset X. Each data point is converted into data (converted data) in a latent space (a latent feature space) Z as a result of nonlinear mapping $f_\theta: X \rightarrow Z$. In an identical manner to the DEC technique, $f_\theta$ can be treated as, for example, a deep neural network. Moreover, $\theta$ represents, for example, a learnable parameter (a first-type parameter) of a deep neural network. For example, the parameter $\theta$ represents the weight and the bias.

In the following explanation, the data expressed using the latent space Z is sometimes called a latent space feature z (or a latent space feature $z_i$). The latent space feature z represents the data obtained by converting the data x using the nonlinear mapping $f_\theta$. Herein, the mapping $f_\theta$ is not limited to the mapping performed using a deep neural network, and can be any other form of mapping.

The initial value of the parameter $\theta$ is learnt using, for example, an autoencoder. Regarding the learning method for learning the initial value, for example, it is possible to implement the same method as implemented in the DEC technique.

Given below is the explanation of the overview of the operations performed in the embodiments. FIG. 1 is a diagram illustrating an exemplary network model (an RDEC model) according to the embodiment. The RDEC model includes three parts, namely, neural network layers 11, neural network layers 12, and a clustering layer 13.

The neural network layer 11 converts the dataset X into the data of the latent space Z. The neural network layer 12 converts the data of the latent space Z into the data of the space of a dataset X' that has the same dimensionality as the dataset X. The clustering layer 13 classifies the data of the latent space Z into K clusters. For example, each data point is assigned to a cluster according to a predicted distribution Q (a first-type predicted distribution) that indicates the probability at which each data point belongs to each cluster.

In the RDEC model, augmented data $x+r_{adv}$ that is obtained by augmenting the data x is used. Thus, $Q(x+r_{adv})$ represents the predicted distribution (a second-type predicted distribution) assigned to the augmented data. As far as the result of clustering performed with respect to the input data is concerned, the predicted distribution $Q(x+r_{adv})$ need not be output.

The RDEC model includes three sub-models, namely, a clustering model, an autoencoder model, and a VAT model.

The clustering model is illustrated by a path 1 in which the data x is converted into the latent space feature z, and the latent space feature z is subjected to clustering and the predicted distribution Q is output.

The autoencoder model is illustrated by a path 2 in which the data x is converted into the latent space feature z, and the latent space feature z is converted into data x' that represents the reconfiguration into the data of the space of the dataset X'. The autoencoder model is the function for obtaining the initial values of the parameters of the neural networks used in the neural network layers 11 and 12.

The VAT model is illustrated by a path 3 in which the data x is converted into the latent space feature z, and the latent space feature z is subjected to clustering and the predicted distribution $Q(x+r_{adv})$ is output.

Given below is the detailed explanation of an exemplary configuration of the clustering model; the VAT model; and the RDEC model that is formed by combining the clustering model and the VAT model.

Clustering Model

As described above, the clustering is performed with respect to the data present in the latent space Z. Firstly, the latent space feature $z_i$ is assigned to the cluster denoted using the centroid $u_j$ with a probability $q_{ij}$ given below in Equation (1). The probability $q_{ij}$ is calculated according to Student's t-distribution. The probability $q_{ij}$ can also be interpreted to represent the degree of similarity (distance) between the latent space feature $z_i$ and the centroid $u_j$.

$$q_{ij} = \frac{(1 + \|z_i - u_j\|^2/\alpha)^{-\frac{\alpha+1}{2}}}{\sum_{j'}(1 + \|z_i - u_{j'}\|^2/\alpha)^{-\frac{\alpha+1}{2}}} \quad (1)$$

Herein, $\alpha$ represents the degree of freedom and is set to 1, for example. The centroid $u_j$ is initialized in the latent space Z using a clustering method such as K-means.

In a target distribution P corresponding to the predicted distribution Q, each $p_{ij} \in P$ is expressed using Equation (2) given below. Herein, $f_j$ represents the probability-weighted cluster size expressed using Equation (3) given below.

$$p_{ij} = \frac{q_{ij}^2/f_j}{\sum_{j'} q_{ij'}^2/f_{j'}} \quad (2)$$

$$f_j = \sum_i q_{ij} \quad (3)$$

As given in Equation (2), the target distribution is calculated by raising the predicted distribution to s-th power and then dividing it by the sum of a plurality of predicted distributions with respect to a plurality of clusters. According to Equation (2), higher the certainty factor of assignment of clusters with respect to the data, the closer becomes the predicted distribution to the target distribution. In the commonplace DEC technique, s is set to 2. However, in the RDEC model, s is set to be adjustable. For example, s can be set to be a real value equal to or greater than 1.

The clustering model is learnt by matching the predicted distribution with the target distribution. An objective function $L_D$ of the clustering model is defined as a Kullback-Leibler (KL) divergence loss between the predicted distribution Q and the target distribution P as given below in Equation (4).

$$L_D = KL[P\|Q] = \sum_i \sum_j p_{ij} \log \frac{p_{ij}}{q_{ij}} \quad (4)$$

VAT Model

An objective function $L_v$ of the VAT model is defined as a KL divergence loss between the predicted distribution Q of the data x and the predicted distribution $Q(x+r_{adv})$ of the augmented data $(x+r_{adv})$ corresponding to the data x as given below in Equation (5).

$$L_v = KL[Q\|Q(x+r_{adv})] \quad (5)$$

Herein, $r_{adv}$ represents the adversarial perturbation calculated, for example, using Equation (6) given below. Moreover, r represents the perturbation that does not cause alteration in the average of the data. Furthermore, ε is a hyper parameter indicating the perturbation size and is set to 1, for example.

$$r_{adv} = \arg\max_{r, \|r\| \le \varepsilon} KL[Q\|Q(x+r)] \quad (6)$$

RDEC Model

An objective function L of the RDEC model is expressed as the weighted sum of the objective function $L_D$ and the objective function $L_v$ as given below in Equation (7). Herein, γ(>0) represents the weight used in controlling the extent of regularization loss.

$$\begin{aligned} L &= L_D + \gamma L_v \\ &= KL[P\|Q] + \gamma KL[Q\|Q(x+r_{adv})] \end{aligned} \quad (7)$$

The objective function L given above in Equation (7) is optimized (learnt) using mini-batch stochastic gradient decent and backpropagation. The latent space feature $z_i$, the centroid $u_j$, and the predicted distribution Q are updated at each iteration of learning. The target distribution P is updated at an interval of τ iterations. The optimization operation is ended when, for example, an ending condition is satisfied, such as when the rate of changes between two consecutive iterations falls below a threshold value σ or when the number of iterations reaches a maximum value Itr.

Figure 2:
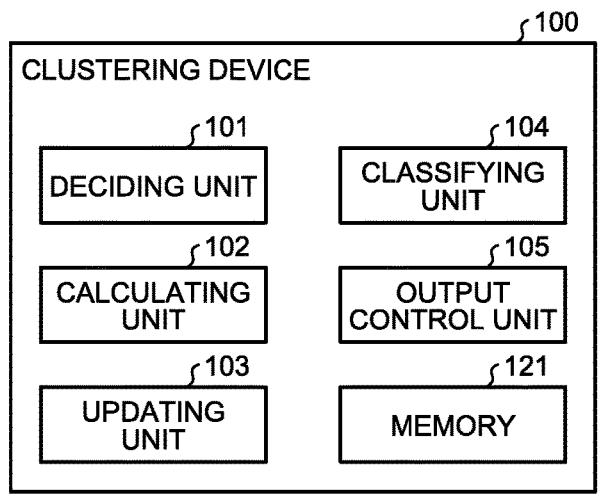
FIG. 2 is a block diagram illustrating a functional configuration of a clustering device according to the embodiment.

Given below is the explanation of an exemplary functional configuration according to the embodiment. FIG. 2 is a block diagram illustrating an exemplary functional configuration of a clustering device 100 according to the embodiment. As illustrated in FIG. 2, the clustering device 100 includes a deciding unit 101, a calculating unit 102, an updating unit 103, a classifying unit 104, an output control unit 105, and a memory 121.

The deciding unit 101 decides on the initial values of the parameters (first-type parameters) of a conversion operation for converting the input data to be subjected to clustering into converted data. As described above, when the nonlinear mapping $f_\theta$ based on a deep neural network represents the conversion operation, the deciding unit 101 decides on the parameter θ using, for example, an autoencoder. Moreover, the deciding unit 101 can be configured to also decide on the initial value of the centroid $u_j$ according to a clustering method such as K-means as described above.

The calculating unit 102 calculates the data and the distribution to be used in clustering. For example, the calculating unit 102 performs conversion mapping and converts the input data into converted data. Moreover, the calculating unit 102 uses cluster parameters (such as the centroid) of each of a plurality of clusters, and calculates a predicted distribution representing the probability at which the conversion data belongs to each cluster. For example, the calculating unit 102 calculates the predicted distribution Q using Equation (1) given earlier. Moreover, the calculating unit 102 performs a calculation operation using Equations (2) to (7) given earlier.

The updating unit 103 updates the parameters of the conversion operation (for example, the parameter θ) and the cluster parameters (for example, the centroid) in such a way that the objective function of the RDEC model is optimized. For example, the updating unit 103 learns the objective function L, which is expressed using Equation (7) given earlier, using mini-batch stochastic gradient decent and backpropagation, and then updates the parameters.

The classifying unit 104 classifies the input data into one of a plurality of clusters based on the predicted distribution that is calculated using the updated cluster parameters. For example, the classifying unit 104 classifies the input data into the cluster in which the probability of having the input data belonging thereto is highest.

The output control unit 105 controls an output operation for outputting a variety of data. For example, the output control unit 105 outputs the processing result obtained by the classifying unit 104. Herein, the processing result represents, for example, labels assigned to the classified clusters. Meanwhile, any method can be implemented as the output method. For example, the following methods can be implemented.

A method of outputting to the display of the clustering device 100 or another device A method of sending to another device via a network The constituent elements described above (the deciding unit 101, the calculating unit 102, the updating unit 103, the classifying unit 104, and the output control unit 105) are implemented, for example, using one or more processors. For example, the constituent elements can be implemented when a processor such as a central processing unit (CPU) executes a computer program, that is, can be implemented using software. Alternatively, the constituent elements can be implemented using a processor such as a dedicated integrated circuit (IC), that is, can be implemented using hardware. Still alternatively, the constituent elements can be implemented using a combination of software and hardware. In the case of using a plurality of processors, each processor can be configured to implement either one constituent element or two or more constituent elements.

The memory 121 is used to store a variety of data to be used in various operations. For example, the memory 121 is used to store learning data to be used in learning and to store the parameters (the cluster parameters and the parameter θ) to be learnt.

The memory unit 121 can be configured using any one of the commonly-used memory mediums such as a flash memory, a memory card, a random access memory (RAM), a hard disk drive (HDD), or an optical disk.

The clustering device 100 can be implemented using, for example, a server device that represents a computer including a processor such as a CPU. Alternatively, the server device can be a cloud server that performs operations in the cloud.

Figure 3:
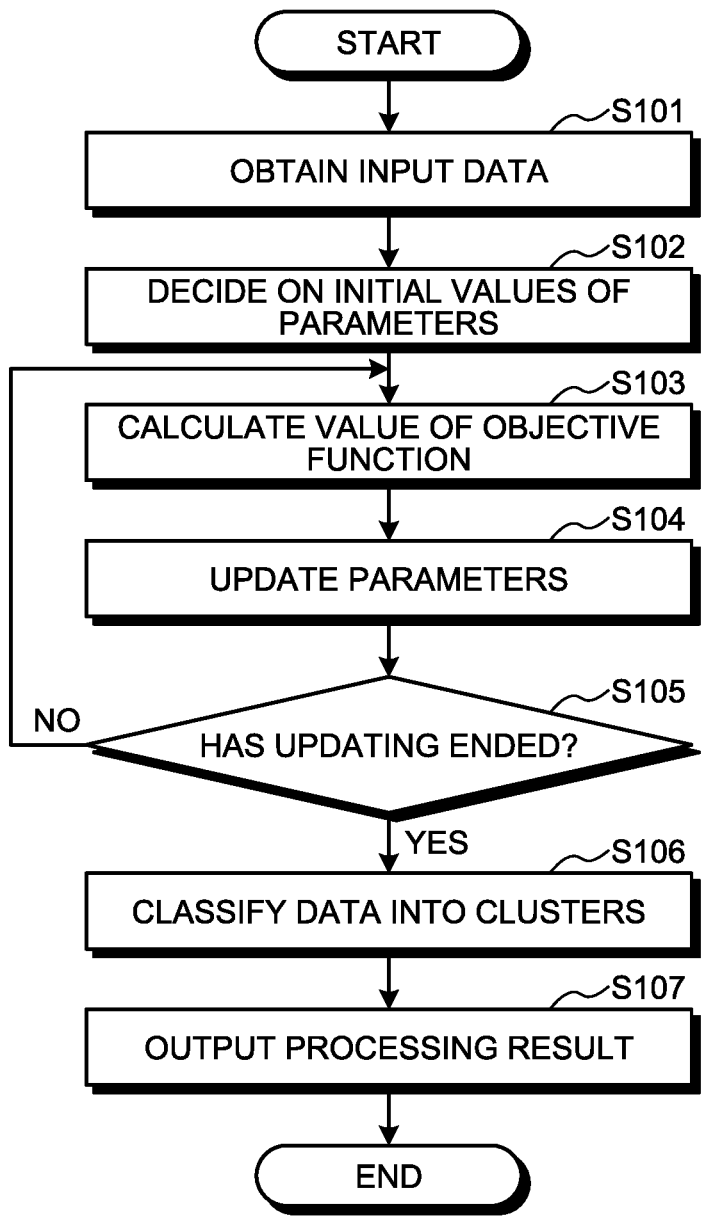
FIG. 3 is a flowchart for explaining a clustering operation performed according to the embodiment.

Given below is the explanation of a clustering operation performed in the clustering device 100 configured in the abovementioned manner according to the embodiment. FIG. 3 is a flowchart for explaining an example of the clustering operation performed according to the embodiment.

Firstly, the deciding unit 101 obtains a dataset of input data to be subjected to clustering (Step S101). The dataset can be obtained using any arbitrary method, such as a method of obtaining the dataset from the memory unit 121 or a method of obtaining the dataset from another device via a network.

The deciding unit 101 decides the initial values of the parameters for the conversion operation (Step S102). For example, the deciding unit 101 uses an autoencoder and decides on the parameter θ of the nonlinear mapping $f_\theta$ to be performed using a deep neural network.

In the operations performed from Step S103 to Step S105, the initial value of the decided parameter θ is used, and the learning operation is repeatedly performed in such a way that the parameter θ and the cluster parameters are optimized.

Firstly, the calculating unit calculates the value of the objective function of the RDEC model using, for example, Equation (7) given earlier (Step S103). The updating unit 103 updates the parameter θ and the cluster parameters in such a way that the calculated objective function is optimized (Step S104). Then, the updating unit 103 determines whether or not the updating has ended (Step S105). For example, as described above, when the rate of changes between two consecutive iterations falls below the threshold value σ or when the number of iterations reaches the maximum value Itr, the updating unit 103 determines that the updating has ended.

If the updating has not ended (No at Step S105), the system control returns to Step S103 and the operations are performed again. When the updating has ended (Yes at Step S105), the classifying unit 104 classifies the input data into clusters based on the predicted distribution that is calculated using the optimized parameters (Step S106). The output control unit 105 outputs the result of classification (Step S107). It marks the end of the clustering operation.

Given below is the explanation of the classification performance achieved according to the embodiment and the classification performance of the conventional methods. FIG. 4 is a diagram illustrating the accuracy of clustering achieved in the conventional methods and according to the embodiment. The conventional methods include K-means and the DEC technique. As far as the evaluation scale of accuracy is concerned, "Accuracy (ACC)" mentioned in Non-patent Literature (Junyuan Xie et al., "Unsupervised Deep Embedding for Clustering Analysis", arXiv: 1511.06335, 24 May 2016) is used.

As described below, six types of datasets include public datasets and datasets sampled based on public datasets in such a way that imbalanced datasets are obtained.

(D1) MNIST: A data set of 70000 handwritten numbers (0 to 9). Each class has approximately the same number of samples.

(D2) MNIST_Imb_0: A dataset of handwritten number images sampled from the MNIST dataset in such a way that an imbalanced dataset is obtained. In the embodiment, of the data of a class 0 corresponding to the number "0", 10% data is sampled. Regarding the other numbers, all of the data is used.

(D3) Reuters: A dataset extracted from the original Reuters dataset that includes approximately 810,000 texts. In an identical manner to Non-patent Literature (Junyuan Xie et al., "Unsupervised Deep Embedding for Clustering Analysis", arXiv:1511.06335, 24 May 2016), data belonging to four categories, namely, "corporate/industrial", "government/social", "markets", and "economics" is extracted.

(D4) Reuters_Imb: A dataset of texts sampled from the Reuters dataset in such a way that an imbalanced dataset is obtained. In the Reuters_Imb dataset, sampling is done in such a way that the number of data points in a particular class is 10% of the number of data points in other classes.

(D5) STL_VGG: A dataset generated based on STL, which is a dataset of images of 10 classes having labels such as airplanes, birds, and vehicles assigned thereto. The STL_VGG dataset is a dataset of 2048-dimensional feature vectors extracted from STL using the vgg-16 model that represents a convolutional neural network model. Each class includes 1300 data points.

(D6) STL_VGG_Imb: A dataset of images sampled from the STL_VGG dataset in such a way that an imbalanced dataset is obtained. In the STL_VGG_Imb dataset, sampling from the STL_VGG dataset is performed in such a way that a particular single class includes 130 data points.

In the RDEC model according to the embodiment, "Accuracy (ACC)" is calculated in the following three patterns having different combinations of the weight γ and the constant s, which is used in Equation (2) for calculating the target distribution P.

(P1) γ=2, s=2

(P2) γ=5, s=2

(P3) γ=5, s=4

Regarding each method, the "Accuracy (ACC)" is calculated five times, and the average value and the standard deviation of each of the five instances of "Accuracy (ACC)" are calculated. In FIG. 4, the values written in the upper rows represent the average values, and the values written in brackets in the lower rows represent the standard deviations.

As illustrated in FIG. 4, regarding almost all datasets, a higher degree of classification performance was achieved in the RDEC model as compared to the conventional method. Particularly, when the RDEC model of the pattern (P2) was used with respect to the MNIST dataset, the "Accuracy (ACC)" of 98.43% (the standard deviation of 0.03) was achieved. Moreover, as illustrated in FIG. 4, regarding the imbalanced datasets (D2) and (D4), when the constant s was varied from "2" to "4", a higher "Accuracy (ACC)" was achieved.

Figure 5:
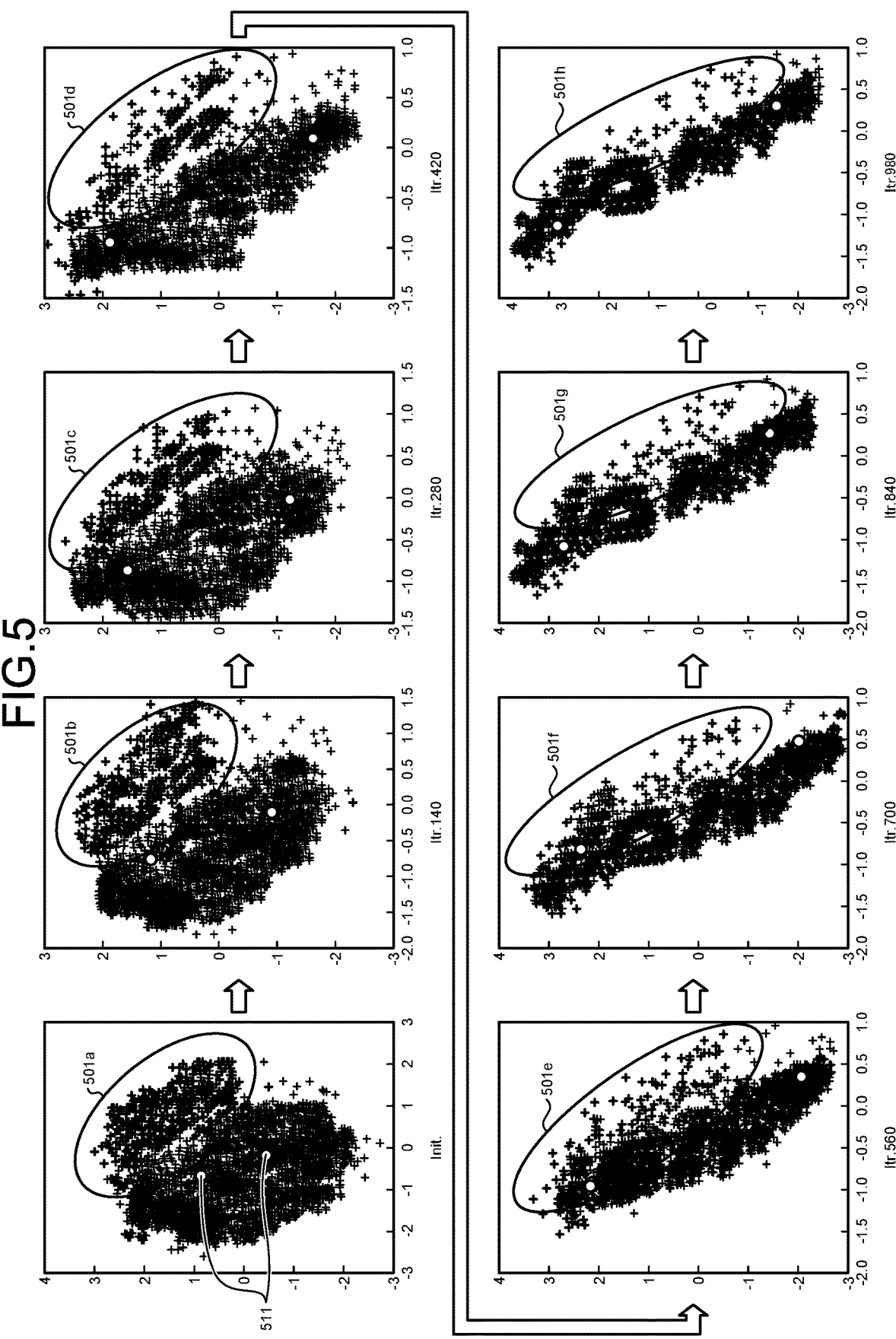
FIG. 5 is a diagram illustrating the learning process carried out using the deep embedded clustering (DEC) technique.
Figure 6:
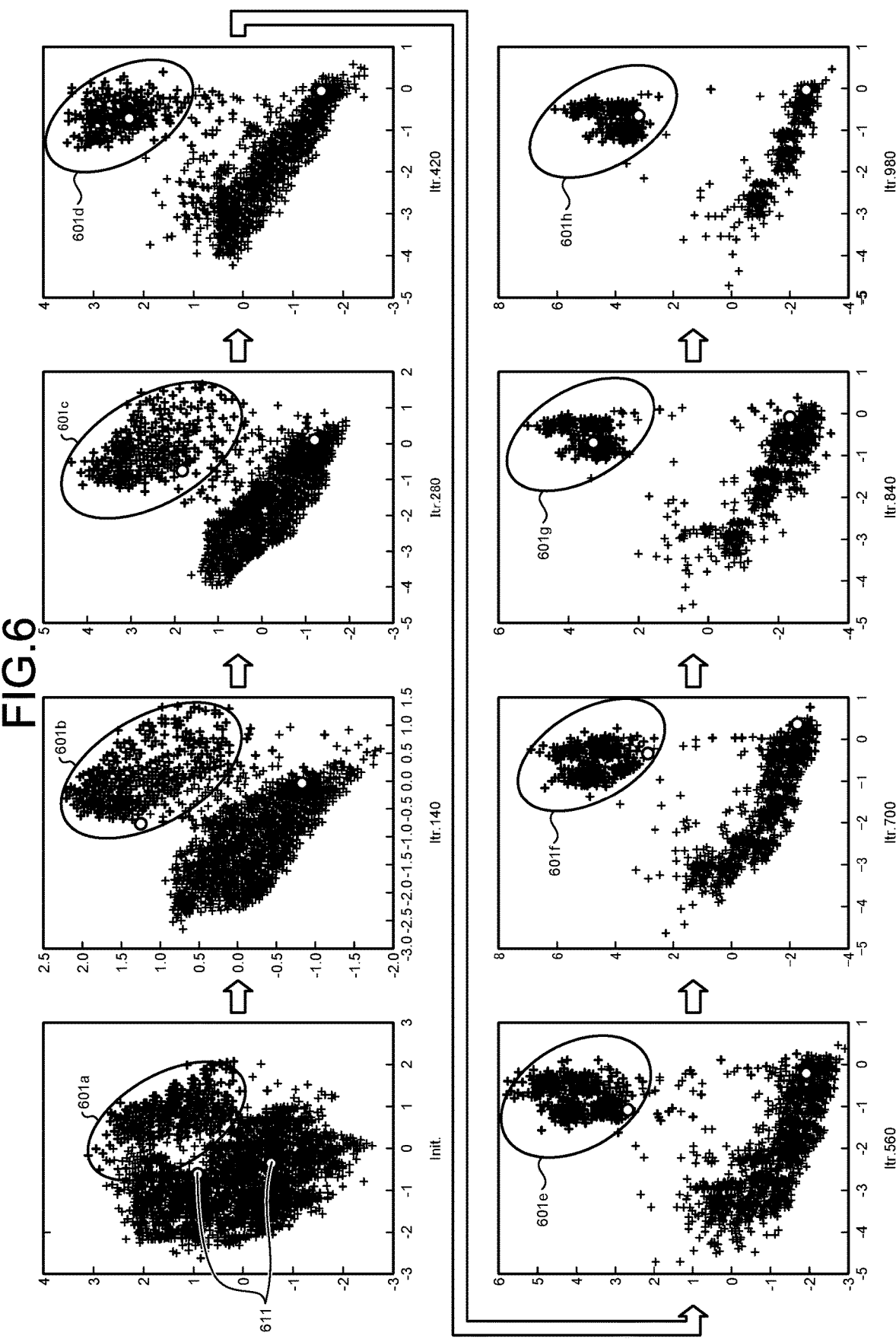
FIG. 6 is a diagram illustrating the learning process carried out using a regularized deep embedded clustering (RDEC) technique.

FIGS. 5 and 6 are diagrams illustrating the learning process carried out using the conventional DEC technique and the RDEC technique, respectively. In the examples illustrated in FIGS. 5 and 6, a minst-based imbalanced dataset was used that included 10% data of the class 0 as obtained by sampling and the entire data of the class 6.

In FIGS. 5 and 6, the initial state is illustrated along with illustrating the classes corresponding to the states in which the iteration count becomes equal to 140, 280, 420, 560, 700, 840, and 980. Each graph represents a data point in the latent space that is subjected to two-dimensional compression.

Moreover, areas 501a to 501h illustrated in FIG. 5 and areas 601a to 601h illustrated in FIG. 6 represent the areas in which a large volume of the data of the class 0 is distributed. Furthermore, white circles 511 illustrated in FIG. 5 and white circles 611 illustrated in FIG. 6 represent the centroids corresponding to the two classes. As illustrated in FIG. 5, in the DEC model, the two classes are not appropriately separated. On the other hand, as illustrated in FIG. 6, in the RDEC model, the data of the class 0 and the data of the class 6 are separated from each other with a higher degree of accuracy.

As described above, poor positioning of the centroids is believed to be one of the reasons for a low degree of separation accuracy in the DEC model. In an imbalanced dataset, the positioning of the centroids often becomes poor. In contrast, the RDEC model has robustness against the initial values of the centroids.

Figure 7:
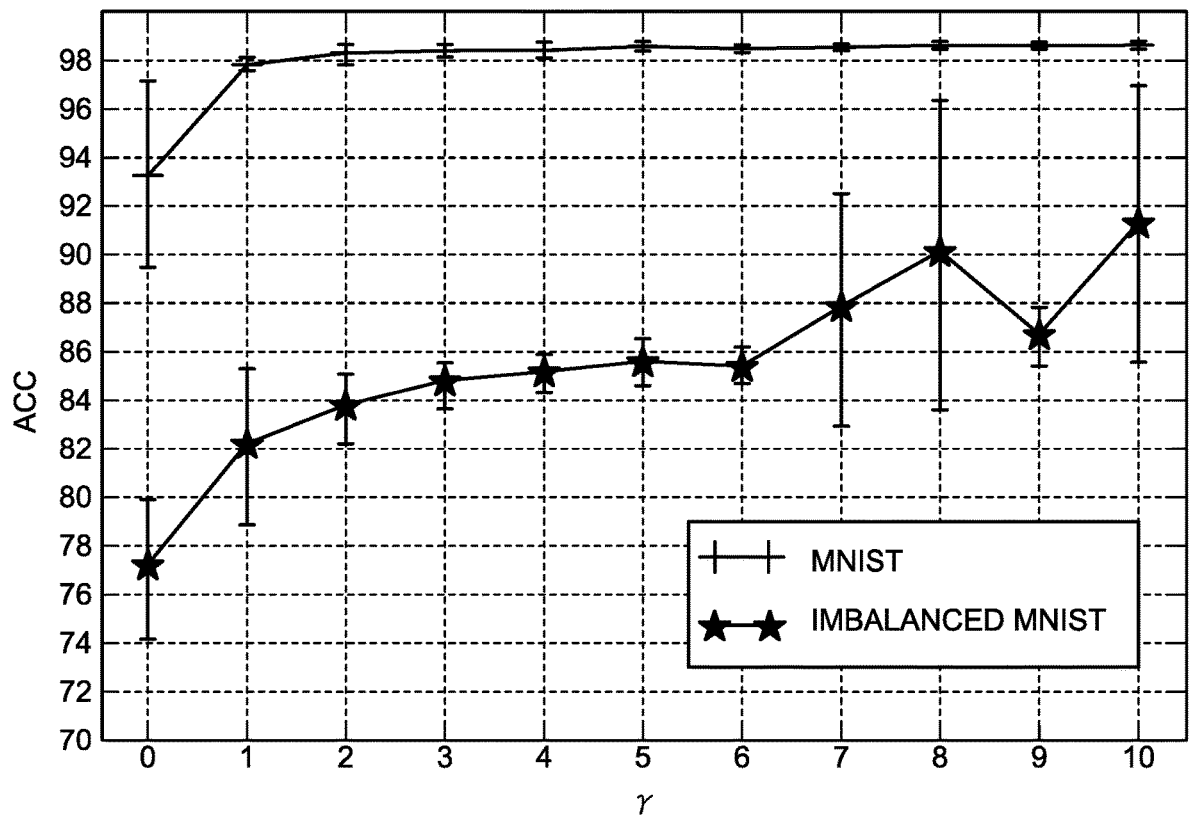
FIG. 7 is a diagram illustrating the relationship between a weight γ and "Accuracy (ACC)"

The following explanation is given about the setting of the value of the weight $\gamma$. The weight $\gamma$ representing a parameter included in Equation (7) given earlier affects the clustering result. FIG. 7 is a diagram illustrating the relationship between the weight $\gamma$ and the "Accuracy (ACC)", and illustrating the effect of the weight $\gamma$ on the "Accuracy (ACC)". With reference to FIG. 7, regarding the MNIST dataset and regarding an imbalanced dataset obtained by performing sampling based on the MNIST dataset (i.e., regarding an imbalanced MNIST dataset), the weight $\gamma$ is set to 0, 1, 2, 3, 4, 5, 6, 7, 8, 9, and 10. Then, the clustering operation is performed five times for each weight $\gamma$; and the average value and the standard deviation of the "Accuracy (ACC)" is illustrated. The other parameter, that is, the constant s is set to 2. Meanwhile, when the weight $\gamma=0$ holds true, the RDEC model has equivalent functions to the DEC model.

As illustrated in FIG. 7, regarding the MNIST dataset, when the weight $\gamma$ is equal to or greater than 2, stable classification accuracy is achieved with a high degree of "Accuracy (ACC)" and with only a small deviation. Regarding the imbalanced dataset, although the "Accuracy (ACC)" increases according to the value of the weight $\gamma$, the classification accuracy is not stable at some of the values of the weight $\gamma$. Thus, from the result of FIG. 7, it is recommended to set the value of the weight $\gamma$ in the range from 2 to 6.

As described above, in the clustering device according to the embodiment, the clustering operation can be performed with a high degree of accuracy even with respect to datasets having only a small number of samples of data.

Figure 8:
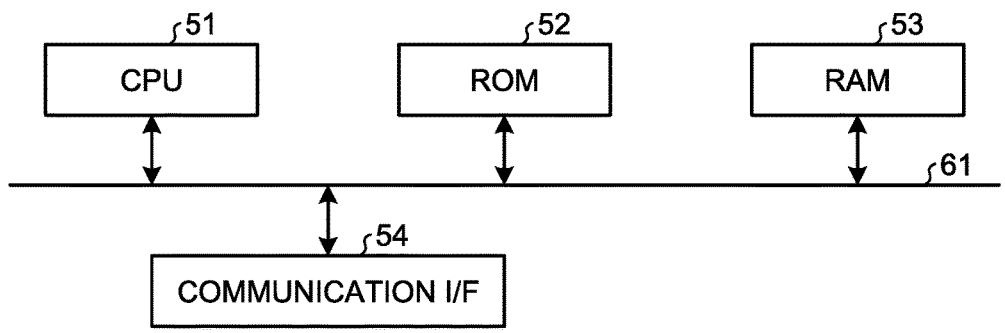
FIG. 8 is an explanatory diagram illustrating a hardware configuration of the clustering device according to the embodiment.

Explained below with reference to FIG. 8 is a hardware configuration of the clustering device according to the embodiment. FIG. 8 is an explanatory diagram illustrating an exemplary hardware configuration of the clustering device according to the embodiment.

The clustering device according to the embodiment includes a control device such as a CPU 51; memory devices such as a read only memory (ROM) 52 and a RAM 53; a communication interface (I/F) 54 that performs communication by establishing connection with a network; and a bus 61 that connects the constituent elements to each other.

The computer program executed in the clustering device according to the embodiment is stored in advance in the ROM 52.

Alternatively, the computer program executed in the clustering device according to the embodiment can be recorded as an installable file or an executable file in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer program executed in the clustering device according to the embodiment can be stored in a downloadable manner in a computer connected to a network such as the Internet. Still alternatively, the computer program executed in the clustering device according to the embodiment can be distributed via a network such as the Internet.

The computer program executed in the clustering device according to the embodiment can cause a computer to function as the constituent elements of the clustering device. In that computer, the CPU 51 can read the computer program from a computer-readable memory medium, load it into a main memory device, and execute it.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A clustering device comprising:
   one or more processors configured to:
   decide on a first-type parameter representing a parameter of a conversion operation for converting input data into first-type conversion data, the input data being subjected to clustering for classifying data into a plurality of clusters;
   based on a plurality of second-type parameters, each representing a parameter of one of the plurality of clusters, calculate a plurality of first-type predicted distributions indicating probability at which the first-type conversion data belongs to the clusters;
   update the first-type parameter and the second-type parameters so as to achieve optimization of first-type differences representing differences between the first-type predicted distributions and a target distribution, and second-type differences representing differences between the first-type predicted distributions and second-type predicted distributions, the second-type predicted distributions indicating probability at which second-type converted data, the second-type converted data being obtained by converting data, which is formed by augmentation of the input data, using the first-type parameter belongs to the clusters;
   and classify the input data into the plurality of clusters based on the first-type predicted distributions calculated using the updated second-type parameters.

2. The clustering device according to claim 1, wherein the second-type predicted distributions indicate probability at which the second-type converted data that is obtained by converting data, which is formed by adding perturbation to the input data, using the first-type parameter belongs to the clusters.

3. The clustering device according to claim 2, wherein the second-type predicted distributions indicate probability at which the second-type conversion data that is obtained by converting data, which is obtained by adding perturbation to the input data in direction in which amount of change is greater than other directions, using the first-type parameter belongs to the cluster.

4. The clustering device according to claim 1, wherein the one or more processors update the first-type parameter and the second-type parameters so as to achieve optimization of weighted sum of the first-type differences and the second-type differences.

5. The clustering device according to claim 1, wherein the one or more processors decide on the first-type parameter using an autoencoder.

6. The clustering device according to claim 1, wherein the conversion operation is performed using a neural network.

7. The clustering device according to claim 1, wherein the one or more processors calculate initial value of the second-type parameters by performing clustering of the first-type conversion data.

8. The clustering device according to claim 1, wherein the one or more processors calculate the target distribution using a value indicating a power of the first-type predicted distributions.

9. The clustering device according to claim 8, wherein the one or more processors calculate the target distribution using a value indicating s-th power of the first-type predicted distributions, s being a real value equal to greater than 1.

10. The clustering device according to claim 1, wherein the one or more processors calculate the target distribution using sum of the plurality of first-type predicted distributions corresponding to the plurality of clusters.

11. A clustering method comprising:
deciding on a first-type parameter representing a parameter of a conversion operation for converting input data into first-type conversion data, the input data being subjected to clustering for classifying data into a plurality of clusters;
based on a plurality of second-type parameters, each representing a parameter of one of the plurality of clusters, calculating a plurality of first-type predicted distributions indicating probability at which the first-type conversion data belongs to the clusters;
updating the first-type parameter and the second-type parameters so as to achieve optimization of first-type differences representing differences between the first-type predicted distributions and a target distribution, and second-type differences representing differences between the first-type predicted distributions and second-type predicted distributions, the second-type predicted distributions indicating probability at which second-type converted data, the second-type converted data being obtained by converting data, which is formed by augmentation of the input data, using the first-type parameter belongs to the clusters;
and classifying the input data into the plurality of clusters based on the first-type predicted distributions calculated using the updated second-type parameters.

12. A computer program product having a non-transitory computer readable medium including programmed instructions,
wherein the instructions, when executed by a computer, cause the computer to perform: deciding on a first-type parameter representing a parameter of a conversion operation for converting input data into first-type conversion data, the input data being subjected to clustering for classifying data into a plurality of clusters;
based on a plurality of second-type parameters, each representing a parameter of one of the plurality of clusters, calculating a plurality of first-type predicted distributions indicating probability at which the first-type conversion data belongs to the clusters; updating the first-type parameter and the second-type parameters so as to achieve optimization of first-type differences representing differences between the first-type predicted distributions and a target distribution, and second-type differences representing differences between the first-type predicted distributions and second-type predicted distributions, the second-type predicted distributions indicating probability at which second-type converted data, the second-type converted data being obtained by converting data, which is formed by augmentation of the input data, using the first-type parameter;
and classifying the input data into the plurality of clusters based on the first-type predicted distributions calculated using the updated second-type parameters.

* * * * *